United States Patent [19]
Lahm

[11] 3,946,296
[45] Mar. 23, 1976

[54] METHOD AND APPARATUS FOR CHECKING AND MONITORING THE ACCURACY OF THE MOVEMENT OF THE CARRIAGE OF A MACHINE TOOL RESPONSIVE TO A PREDETERMINED OPERATING PROGRAM

[75] Inventor: Heinrich Lahm, Esslingen-Sirnau, Germany

[73] Assignee: Index-Werke KG Hahn & Tessky, Esslingen, Germany

[22] Filed: Mar. 5, 1974

[21] Appl. No.: 448,269

[30] Foreign Application Priority Data
Mar. 8, 1973 Germany.............................. 2311368

[52] U.S. Cl.................................. 318/563; 318/568
[51] Int. Cl.².......................................... G05B 19/42
[58] Field of Search............................ 318/563, 568

[56] References Cited
UNITED STATES PATENTS

| | | | |
|---|---|---|---|
| 3,138,750 | 6/1964 | Borger et al. | 318/563 |
| 3,164,909 | 1/1965 | Rosenberg | 318/568 X |
| 3,727,119 | 4/1973 | Stanley et al. | 318/568 |

*Primary Examiner*—B. Dobeck
*Attorney, Agent, or Firm*—Murray Schaffer

[57] ABSTRACT

The disclosure relates to a method and apparatus for checking and monitoring the movement of a tool carriage in response to a numerical controlled program. The path of movement of the tool carriage is recorded independently of the program control during the initial run of the carriage, in a manner capable of being subsequently sensed. The recorded path is thereafter sensed during the subsequent runs of the carriage and a signal is produced when the carriage deviates from the recorded path. The recording device includes a stationary supporting member having a surface upon which a drawing or etching may be made. The drawing or etching member is mounted to the movable carriage so as to become jointly movable therewith. The sensing member is mounted in conjunction with the drawing instrument and is interchangeable therewith during the sensing portion of the procedure.

26 Claims, 6 Drawing Figures

METHOD AND APPARATUS FOR CHECKING AND MONITORING THE ACCURACY OF THE MOVEMENT OF THE CARRIAGE OF A MACHINE TOOL RESPONSIVE TO A PREDETERMINED OPERATING PROGRAM

BACKGROUND OF THE INVENTION

The present invention relates to a method and apparatus for checking and monitoring the accuracy of computerized or numerically controlled machine tools and in particular to a method and apparatus for continuously checking and monitoring the accuracy of the path of movement of the tool holding carriage of such machines during its normal operation in response to the preprogrammed computerized control.

Due to the complicated construction of the electronic circuits of computer or numerical control systems, the accuracy of the continued operation of the machine tool can be interfered with by external influences such as excessive vibration of the computer or controls or by the imposition of a stray voltage pulse from outside sources. In the event of such interference, incorrect data is processed and passed on to the machine carriage as a specific program order. Since the machine cannot distinguish between a correct or an incorrect order the machine is caused as a consequence to undertake a faulty movement. Such faulty movements frequently result in the destruction of costly tools or other parts of the machine itself as well as in damaging or destroying the work piece on which it is operating. Thus, not only do expensive parts of the machine have to be replaced, but the downtime of the machine during such replacements results in still further costs in production. This is a serious problem in the operation of machine tools since, particularly with the use of numerical control systems, the processing of incorrect data occurs irregularly and it is therefore difficult to predict and recognize in advance.

The most frequent cause of machinery damage occurs from an undesirable and wrong movement performed by the slideable carriages or movable tool holders. As a rule, the undesirable movement not only occurs in a fraction of a millimeter, but frequently, according to the decade of the control system being employed, up to a length of several millimeters. In fact, the undesirable movement frequently corresponds to the entire path of travel of the carriage. As a result, in addition to the disadvantages noted above, severe damage to the machine through collision of the moving parts frequently occurs.

For the above reasons, several methods have already been resorted to for increasing the functional safety of numerically controlled machine tools. One well-known measure consists of constructing the numerical control system in such a way that the punched tape coding containing the program is itself checked. To establish a standard the symbols which are stamped onto the punch strip have either an even or an odd number of perforations. In this manner the numerical control system is always capable of detecting an error when the even or odd number of the combination of punches does not correspond to the fixed standard. According to this system a reading error is indicated and a signal provided by which the control system is switched off. This system is based upon what is commonly referred to as "the parity check." The parity check insures that faulty movements of the machine do not occur when a particular order on the punch strip has a hole too many or too few. This system operates particularly advantageously when the punch strip is damaged or fouled so as to record an absence of a punch hole in a particular order. As a result of such damage the machine is brought to a standstill. The method of parity checking operates however only when one too many or one too few holes is detected. The system, however, does not distinguish between two holes and while the odd and even number rule is always adhered to, other defects and improper codings are not sensed and the machine is thus not switched off even when a faulty operation is taking place.

A further well-known measure provides for the repeated processing of the punch data in the punch strip reader at a predetermined frequency until a new punch order is read in. This repetition of the program reduces the likelihood of external interfering influences causing the transmission of a wrong data order to the machine tool. This type of control is, however, very expensive. Furthermore, it does not prevent the performance by the machine of an incorrect movement produced by an incorrect reading of the punch strip or by an error in the electronic system of the numerical control. As for example the failure of one of the electronic components. This type of system is described in the Swiss patent No. 480,915.

Another device is known from a report in the Journal "Werkstatt und Betrieb" No. 10 1969 by which the working program is simulated exterior of the machine and recorded by a drawing machine. In this system a visual indication of the working program is obtained during its initial run. However, errors occurring during the repetition of the program are neither sensed nor detected nor are they employed to control the machine operation.

Still another system employs a copying machine in which the shape of the work piece is defined as a length of a line which is scanned optically. The movement of the machine is controlled initially by the optical scanner and the machine is thus driven only as accurately as the drawing of the line and as accurately as the scanning system operates. The continuous line, of this system does not serve in this case to control the machine tool which receives a program from another source but to the contrary represents the program itself. Thus, disturbances in either the line or scanning system will lead to deviations in the program itself and cannot provide a self monitoring or checking system.

It is the object of the present invention to provide method and apparatus for operating a numerical control machine tool which overcomes the disadvantages of the prior art devices.

It is another object of the present invention to provide apparatus and method for checking and monitoring the path of movement of the tool carriage of a numerically controlled machine tool independently of the numerical control system or the initial operating program.

It is a further object of the present invention to provide a method and apparatus for checking and monitoring the path of movement of the movable member of a numerically controlled machine tool as a result of the direct movement of this movable member.

It is a further object of the present invention to provide method and apparatus for monitoring the path of movement of a numerically controlled machine tool so as to avoid expensive damage to the machine during its operation.

The foregoing objects, other objects, as well as numerous advantages of the present invention will be apparent from the following disclosure of the present invention.

SUMMARY OF THE INVENTION

The method of checking and monitoring the operation of a numerically controlled machine tool in accordance with the present invention comprises the steps of independently recording the path of movement of the machine carriage in question, during its initial run in response to the numerically controlled program. Thereafter, in all of the subsequent reruns performed by the carriage, according to the same numerically controlled operating program, the independent recording is scanned and sensed continuously so that it may be monitored for any movement of the carriage departing from the recorded path. Should such departure from the recorded path be sensed, a signal is then generated which is employed to stop the operation of the control system and thereby bring the machine to a standstill.

In accordance with this method, although all the runs of the machine can be performed according to the program contained in the numerical control system, the independent recording is made as a result of the first run and thereby becomes a standard by which all the subsequent runs of the machine can be continuously compared. By scanning the recording simultaneously with the movement of the carriage during its subsequent runs an accurate comparison may be made between the initial numerically controlled program and the actual path taken by the carriage during each of its subsequent runs. Should during the subsequent run a fault occur due to the imput of the numerical control system or due to some other faulty imput, the path of the carriage would no longer agree with the recording and a signal indicative thereof would be produced. The signal can be used at least to stop the movement of the carriage in question, or the entire machine, so that no damage to either would occur.

The present invention also makes it possible to organize the monitoring and production of the fault signal so that only deviations of a predetermined order from the programmed path will result in the switching off of the machine. Thus, for example, deviations greater than the order of a millimeter can be employed to produce the fault signal so that unnecessary disconnection of the machine can be prevented. The system can also be arranged so that deviations resulting from tracking errors arising from changes in direction of the carriage, or in its rapid traverse or reversal, within a permissible degree of deviation, not result in the stopping of the machine tool.

According to the present invention the recording of the paths of the carriage corresponding to the working program can be carried out in different ways. For example, the path can be recorded magnetically, electromagnetically, or electrostatically. The recording may also be made photoelectrically with the use of a movable light.

It is preferable, however, that the recording is made so that it can be detected visually even during the process of recording. The visual recording enables the detection of any faults which might be established even during the initial or first run of the program. In general, the path of the movable carriage can be recorded or logged in a single recording. It is however, also possible to record the paths determining the movement of the tool box, along two axes, at right angles to one another in a single recording or in separate recordings.

Not unfrequently, the machine tool is fitted with a carriage or tool holder having a turret in which several tools are mounted. In particular during a drilling operation, the tool holder or carriage may be moved several times in succession in the same direction, employing each time a different tool. In such a case, the individual portions of the path to be recorded in response to the initial movement of the tool holder or carriage, will unfortunately lie one above the other on the recording surface. Thus, subsequent paths are superimposed upon the preceding path and the possibility of checking and monitoring the size of the individual movement may be lost. This difficulty can be avoided in accordance with one form of the present invention by causing the recording instrument to be offset by a predetermined amount when recording a second and other subsequent path corresponding in the same direction of a previously recorded path. In this manner all paths which would normally be superimposed upon each other are made to lie side by side parallelly offset from each other.

As a further advantage of the present invention particularly wherein the forward speed of the tool holder or carriage varies from that of the traversing or reverse speed it is possible to record each path in a different manner, indicative of their working speed. Thus, after the recording of the first program run it can be visibly detected and determined which recorded path is run at which speed. This can be achieved simply at the time the recording is made by providing different indicia for each speed. Thus, the forward speed may be made as a continuous line while the traversing speed can be made at broken but regular intervals. It is thus possible with the aid of this type of recording, to influence the control of the machine so that in all of the subsequent runs of the machine the tool holder or carriage may be stopped if a fault occurs on its forward movement at its working speed but wherein the traversing or reverse movement of the tool holder or carriage can be accomplished at an extremely rapid speed since during this movement the occurrence of a fault in the program would not influence the working of the tool holder or the carriage. It is further possible according to the present invention wherein in traversing the length of the path characterized by having regularly uniform interrupted intervals, scanning pulses can be produced which are passed through the numerical control and compared with a preprogrammed requisite pulse system whereby the speed of operation can be compared and the machine, tool holder or carriage can be switched off when it exceeds a predetermined pulse frequency.

For carrying out the method, the invention makes use of apparatus which is characterized by at least one drawing mechanism comprising a stationary support having a recording surface and a recording or marking element coupled to the movable took holder or carriage. A sensing device is arranged in conjunction with the recording or marking element capable of sensing the recording thus made during each of the subsequent runs of the machine. In the preferred form of the apparatus the support includes a planar or flat recording surface capable of receiving lettering or other visual indicia. The recording element may be in the form of a drawing pencil and the sensing element may be in the form of an optical sensor capable of scanning the visual markings. It is also possible to engrave or etch the recording onto the recording surface by means of a recording element such as a stylus and to rescan the thus recorded indicia mechanically by means of a tactile feeler or the like.

In order to prevent lengths of the recorded path from being recorded one over the other in the same direction either the support for the recorded surface or the recording or marking element itself may be adjustable by means of a step by step or incremental mechanism controllable by an electrical control system. Preferably each axis of movement of the movable tool holder or carriage will have assigned to it an independent drawing, recording and scanning mechanism. In each instance it is preferable that the support for the recording surface be held stationary and for the recording or marking element and the sensing device associated with it to be adjustable.

Further, according to the present invention, the recording or marking element of the recording mechanism and the sensing element of the scanning mechanism are arranged on a common support which is pivotal about an axis parallel to the plane of the recording surface. In this manner an advantageous design is obtained when the recording or marking element and the sensing element are arranged at angular distances one from another in a common plane at right angles to the pivoting axis of the support. In this manner the support can be easily rotated about its axis placing the recording or marking element or the scanning element in proper position above the recording surface. Fixed stopss are provided adjacent the rotating support so as to limit its rotative positions. Further, it is preferred that the recording or marking element be arranged so as to be adjustably movable within the pivoting support so that it can be lifted from the recording surface before the support is rotated to place the sensor in position above the recording surface. In this manner the recording or marking element can be removed from contact with the recording surface so that it will not subsequently interfere with the scanning of the surface or unnecessarily mark the surface.

If the recording is to be sensed mechanically, for instance by a feeler device engaging within a line engraved on the recording surface, it is preferable to make the sensing element capable of adjustment from its scanning position into a lifted position just as the recording element is adjustable. If on the other hand sensing is to be performed optically, the sensing element can be maintained always at a fixed distance from the plane of the recording surface.

The recording or marking element can be provided with electrical means, such as a solenoid which can be used to lift the element from engagement with the recording surface. The use of such a solenoid device enables the marking of the recording surface with the interrupted line indicating the movement of the workholder or carriage at traversing or working speed by merely impressing upon the solenoid a pulsating signal at regular distances and at predefined frequency. It may also be advantageous and it is in accordance with the present invention that the pivoting of the support holding the recording or marking element and the sensor may be carried out by an electrical control device responsive to the numerical control system and the prepunched program.

For the sake of completeness it should also be mentioned that the method according to the present invention can be carried out with the kinematic reversal of the parts. As for example when the tool holder or carriage is held stationary and the work piece performs the working movements.

Full details of the present invention are given in the following description of its preferred embodiments and are show in the accompanying drawings.

DESCRIPTION OF THE INVENTION

Figure 1:
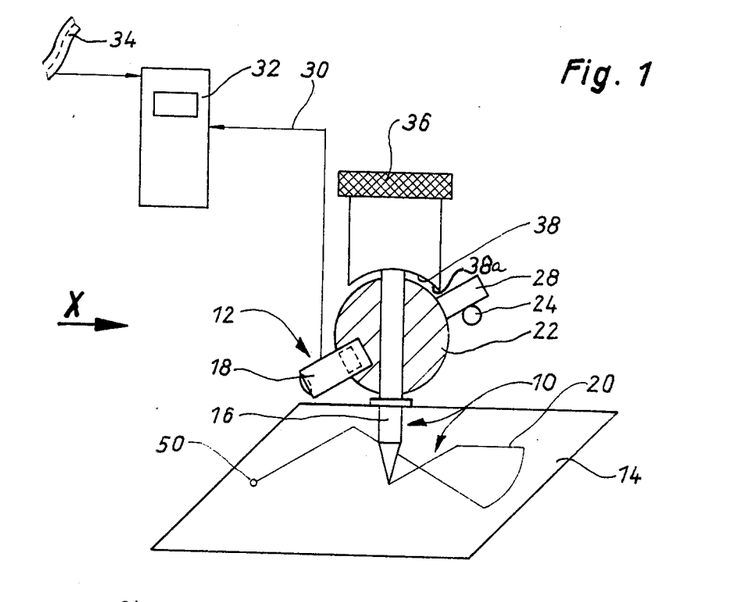
FIG. 1 is a diagrammatic view of one embodiment of the present invention illustrating both the apparatus and the method.
Figure 2:
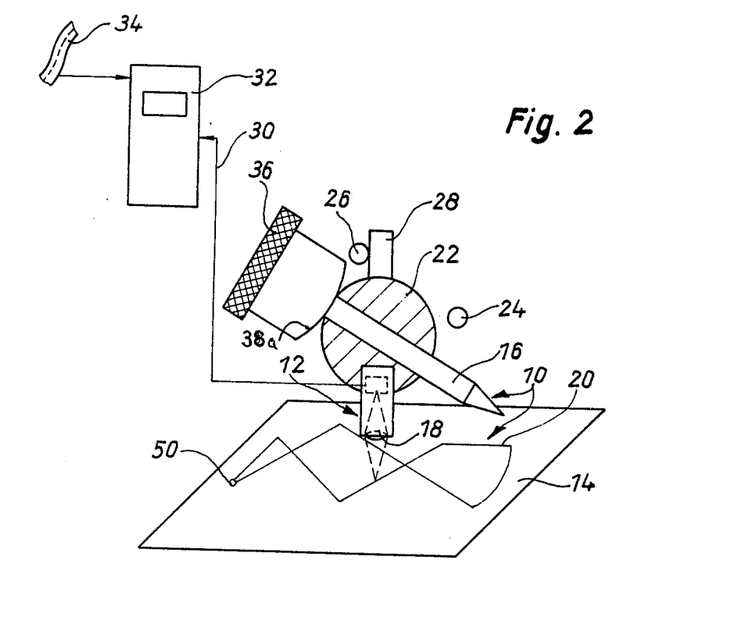
FIG. 2 is a view similar to FIG. 1 illustrating the positioning of the sensing device in the scanning position.
Figure 3:
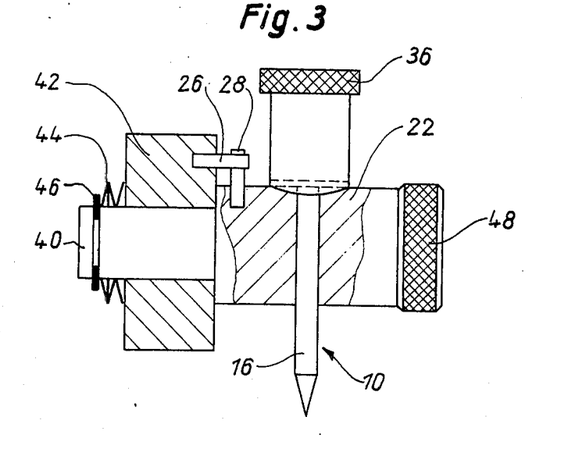
FIG. 3 is a partially sectioned view taken in the direction of arrow X of FIG. 1.

Turning now to FIGS. 1 through 3, the checking and monitoring device of the present invention comprises basically a recording mechanism generally depicted by the numeral 10 and a scanning mechanism generally depicted by the numeral 12. The recording mechanism 10 comprises a stationary support 14 having an upper surface which can be written or marked with suitable indicia and a recording or marking device 16 such as a pencil, pen, stylus or the like. The recording mechanism is capable of making a visible record of the movement of the tool carrier or other machine component such as one of the slides of a carriage of the machine tool which is to be checked and monitored. For this purpose the recording or marking device 16 is fixed to the movable part of the machine so that it follows directly its movement. The supporting surface 14 is preferably planar and flat having an upper drawing surface, the recording element is movable between a lower drawing position engaging the surface of the support 14 as seen in FIG. 1 and an upper lifted position removed from the support as seen in FIG. 2.

The scanning mechanism 12 comprises a sensing head 18 such as an optical or photoelectric sensor which is movable between an inoperative position as seen in FIG. 1 and an operative position perpendicular to the surface 14 as seen in FIG. 2.

In the illustrated example the recording element 16 and the sensing head 18 are mounted on a common cylindrical supporting carrier 22 which is mounted to be rotatable about its central axis extending parallel to the plane of the support 14. The recording element 16 and the sensing head 18 are angularly offset from each other in a common plane perpendicular to the axis of rotation of the carrier 22 so that rotation of the cylindrical carrier will selectively present either the recording element 16 or the sensing head 18 above and perpendicular to the surface of the support 14. Two fixed stop pins 24 and 26 are located at fixed spaced intervals about the periphery of the cylindrical carrier 22 and a radially extending finger 28 is secured to the carrier. In this manner rotation of the carrier 22 is limited into each of the operative positions for the recording element 16 and the sensing head 18 respectively.

Figure 5:
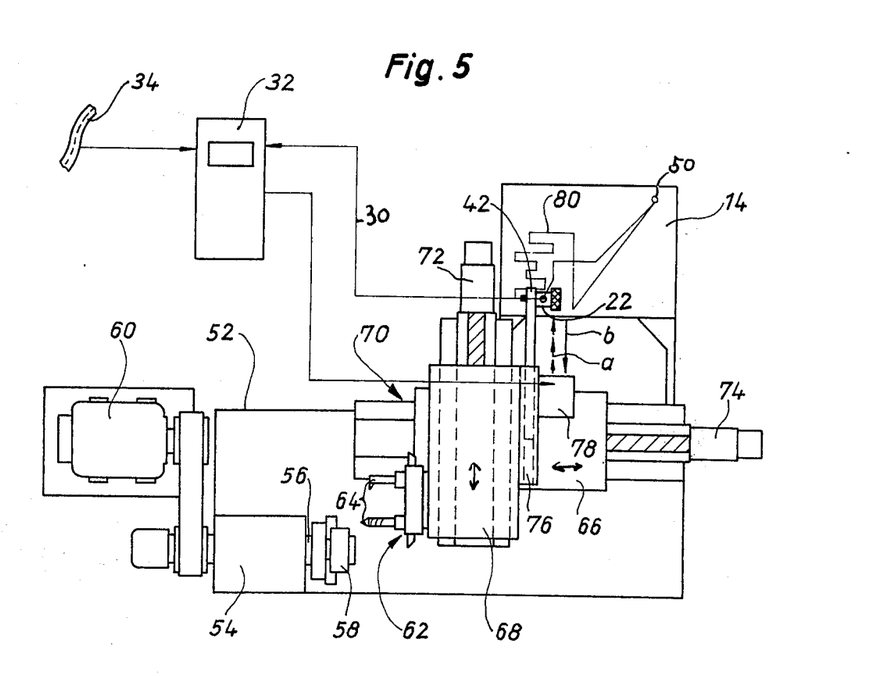
FIG. 5 is a schematic plan view of the present invention adapted to check and monitor an automatic lathe having a movable turret head mounted on an upper rest of a compound slide.

The sensing head 18 is connected via suitable electrical conduits and circuitry 30 to a numerical control system unit 32 of conventional design by which the machine tool such as the lathe of the type illustrated in FIG. 5 is operated in accordance with a predefined program. The numerical control unit 32 is supplied with a punch tape 32 or other prerecording depending upon its nature.

The recording element 16 is axially movable within the cylindrical carrier 22 so that it may be removed from the drawing surface 14 when the scanning function is to be performed, so as not to be in the way of the sensing head 18 or to inadvertently mark or damage the surface 14. The recording element 16 is thus slidably mounted in a radial bore in the carrier 22 and this provided its upper end with a knurled knob 36 by which it may be rotated about its central axis. The lower edge surface of the knob 36 is provided with a concave form 38 which conforms to the convex configuration of the cylindrical carrier 22 and which has lateral edges 38a having itself a convex curvature, as seen in FIG. 2. Rotation of knob 36 causes the lateral edges 38a to slide along the peripheral curvature of the support carrier 22 thus producing an axial lifting movement on the recording element 16.

The cylindrical carrier 22 is provided with a coaxially extending bearing shaft 40 freely journalled in a bore formed in an arm 42 adapted to be secured to the movable machine part such as the tool holder or carriage member, as seen in greater detail in FIG. 5. The free end of the bearing shaft 40 is provided with spring washers 44 such as the belleville springs set between the arm 42 and the a retaining disc 46 such as a removable C-clip. The rear end of the cylindrical carrier 22 is also provided with a knob 48 by which the carrier may be rotated about its central longitudinal axis into either of its two stop positions defined by the pins 24 and 26. The supporting arm 42 is thus mounted to be movable with respect to the tool holder or carriage member. On the other hand, the recording surface support 14 is adapted to be held stationary and in fixed position with respect thereto.

In operation, a working program, provided on the punch strip 34 is initially carried out on the relevant machine tool part, if it is checked first for its accuracy and then in the event of its faultless execution is repeated on successive workpieces while being regularly monitored during the subsequent runs of the machine by the present invention. To this effect this procedure the carrier 22, connected to the appropriate tool holder or carriage, is rotated into its stop position shown in FIG. 1 so that the recording element 16 is lowered and engages the surface of the support 14. On the initial run of the machine a recording, as illustrated in FIGS. 1–3, of the integrated path of the movable tool is made. The recording element 16 starts at a given point 50, which corresponds to the starting point of the relevant movable machine member and makes a series of lines corresponding to the path of movement of the work tool. At the end of the program, the recording is thus terminated at the beginning point 50 as would the tool holder so that the recording indicated by the numeral 20 is present as a closed continuous line or continuous loop program.

After the first programmed run the drawing element 16 is lifted as described above by turning the knob 36 and the supporting carrier 22 is rotated into its other stop position so that the sensing head 18 is now directly above the point 50 of the recording. Visual confirmation of the accuracy of the first run is made both on the recording and the workpiece. The machine is then permitted to repeat the program in response to the punch strip 34. On the next and all subsequent program runs, the sensing head 18 scans the entire line of the recording 20 from its initial point to the same terminus both indicated by 50, completely independent of the punch program 34 or the operation of the numerical control. If due to a fault, as for example in the numerical control system, the path of the associated movable member of the machine deviates from the contour of the recorded line, the sensing head 18 detects this and produces a signal indicative of such fault. This fault signal is fed via the circuitry 30 to the numerical control unit 32 whereby movement of the machine, and/or the appropriate slide or tool holder is stopped. This feedback from the sensing head to the numerical control unit is virtually instantaneous insuring that faulty movements of the machine which are due to faults in the numerical control system are thus prevented.

In general, the movable member such as the respective carriage slides take reciprocating alternating movements in order to move the tool holder in an integrated path in feed and return directions. In practice the forward or feed movement is performed at a deliberate speed so that an accurate working of the workpiece is obtained. The return or traversing movement can be performed at a more rapid speed since the tool is generally no longer in working engagement with the work piece. Frequently, a fault occurs in the numerical control system which orders the movable member of the machine tool to conduct a rapid traversing movement instead of the desired forward feed movement. It is therefore necessary, at times, to distinguish in the recording between the two types of movement.

Figure 4:
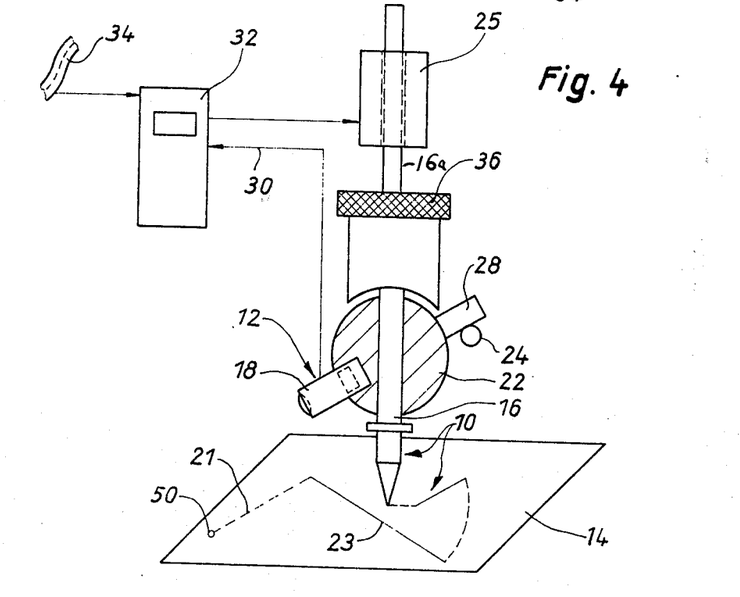
FIG. 4 is a view similar to FIG. 1 illustrating second embodiment of the present invention.

The foregoing is accomplished by recording the path of the tool carrier on the recording surface of the support 14 with one indicia for the forward movement and another for the return or traversing movement. This can be simply achieved, as indicated in FIG. 4, by recording the feed motion as an interrupted line 21 and the return or traversing motion as a continuous line 23. To produce the interrupted line during the movement of the slide carriage, the recording element 16 is extended upwardly, or is provided with an extended core 16a, about which an electrical coil 25 is wound. The coil 25 is adapted to be periodically excited, at a preset frequency, by the numerical control unit 32. The coil 25 and the extending core 16a act as a solenoid responsive to the frequency of its pulsating signal to perform a small lifting movement of the recording element 16 at uniform intervals corresponding to the electrical impulses. Thus, the recording element is caused to touch the surface of the support 14 for only brief timed intervals producing a discontinuous or interrupted line.

The sensing head 18 and the scanning apparatus is adapted to read the discontinuous or interrupted line 21 and to pass the signal derived therefrom with the same frequency to the control unit 32. A conventional comparison circuit is built into the control unit (and not represented in detail here), with a predetermined maximum frequency preset in the control unit. This predetermined maximum frequency need not be the frequency at which the interrupted line 21 was recorded and need not represent the speed at which the initial run of the machine tool was accomplished. Should the frequency of the signal derived from the sensing head 18 exceed the predetermined maximum frequency set in the control unit 32 then the signal is passed to the machine tool to either stop the movable member or the machine tool as a whole. This arrangement insures that during the working forward stroke of the machine tool there can be no traversing speed more rapid than that set by the predetermined frequency. As a result the overloading of the machine and tool breakdown are completely avoided.

An example of the simple apparatus shown in FIGS. 1 to 5 as applied to a numerically controlled lathe is illustrated, by way of example, in FIG. 5. In this Figure, the lathe is provided with a frame base 52 on which is mounted a headstock 54 having a rotatable spindle 56. The spindle is provided with a chuck in which is mounted a work piece 58. The headstock and spindle 56 is driven by a main motor 60 linked thereto in conventional manner. A rotatable turret 62, in which a large number of tools 64 are secured, is mounted in conventional manner on a compound slide carriage, generally depicted by the numeral 70. The compound slide carriage comprises a lower slide 66 and an upper slide 68. The lower slide 66 is driven by a conventional motor 74 and a screw shaft connection while the upper slide 68 is driven by a similarly conventional motor 72 and a screw shaft connection to it. The slide 68 is thus adapted to move parallel to the headstock 54 while the slide 66 is adapted to move toward and away in a perpendicular manner to the headstock. The movement of the slide member 66 and 68 and the control of their drive motors 72 and 74 is conducted via the preprogram punched on the tape 34 as fed to the numerical control unit 32. This control of the compound slide is conventional and the details of the structure necessary and the performance thereof will be well known to those skilled in the art, accordingly further details are not given in the present specification.

As may be clearly seen from FIG. 5 the support 14 on which the recording surface is arranged is mounted on the machine base 52 so as to be stationarily fixed with regard to the compound slide 70. The cylindrical carrier 22 which is equiped with the recording element 16 and the sensing head 18 is provided with its supporting arm 42 mounted in an indexing device 76 which is fixedly secured to the upper slide 68 so as to be conjointly movable with it in its working direction. The indexing device 76 serves to permit the incremental movement of the arm 42 and thus the carrier 22 in a direction a, parallel to the working axis of the upper slide 68. The indexing device may be suitably formed from a pinion and rack, the rack being secured to the arm 42 while the pinion to a control mechanism 78 receiving a pulse from the numerical control system 32. In this manner the arm 42 may be periodically indexed, on command from the numerical control unit 32 so that successive operation of the slide 68 with more than one tool 64 can be recorded on offset positions on the recording surface. Thus, individual portions of a given program run in which one or more tools 64 are used, such as in a drilling operation, with successive movement of the slide 68 will not be recorded by superimposition of one line over the other. A simple command to the indexing mechanism 78, which may be a reversible indexing motor, will shift the arm 42 in the direction of the discontinuous arrow a moving the recording element in a plane above the surface 14. Preferably this lateral shifting of the arm 42 is programmed for each changeover of tool made on rotation of the turret head.

Even without a change in tool during a program run, it is possible to program a shift order by which the indexing mechanism 78 causes the arm 42 to shift. In this manner a continuous loop program indicated by the numeral 80 can be recorded on the recording surface so that there is no overlapping or superimposition of the program line. Thus a program in which the slide 68 is moved in its axis over exactly the same line as it had been previously moved can be recorded, not by superimposed indicia, but by indicia offset with respect to each other. The punch tape 34 can of course be provided with suitable commands for actuating the indexing control mechanism 78 any number of times.

On completion of the first run of the working program, in response to the predetermined program fed to it by the numerical control system 32 a signal is obtained from the punch tape 34 which provides an order to the carriage 68 so that it returns into its initial starting position along the direction indicated by the arrow b. The carrier 22 with the recording element and the sensing head 18 is thus returned to its initial position 50 at which time the recording element 14 is lifted and the sensing head 18 brought into perpendicular relationship above the supporting surface 14. The machine can be thus rerun an indefinite number of times repeating the program defined initially by the punch strip 34. In each of these subsequent runs the sensing head 18 checks and monitors the movement of the slide 68 by its conjoint movement with it over the prerecorded program 80. Any deviation from this recorded program will produce a signal in the manner previously described which is fed back to the control system unit 32 so that appropriate stop action can be obtained prior to any damage either to the machine, the tool or the work piece.

Figure 6:
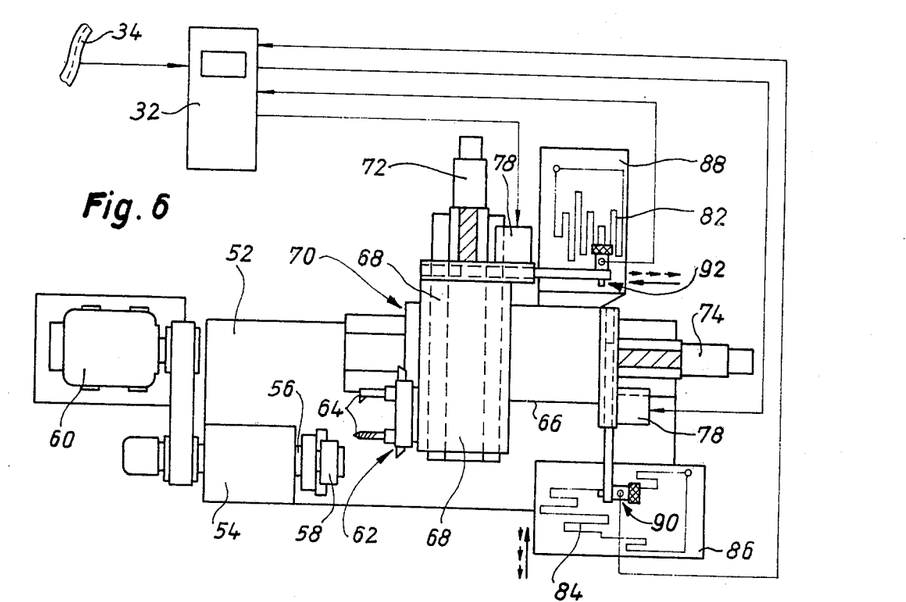
FIG. 6 is a view similar to that of FIG. 5 illustrating the recording of the movements of both the upper and lower tool rests of the compound slide.

FIG. 6 shows a practical example of means by which the recording of a continuous line path can be carried out in simplified form. In FIG. 6 the lathe shown in FIG. 5 is also shown. Here, however, the individual paths of the corresponding movable members such as the slides of the compound carriage by which the integrated track or path of the tools 64 are made are each recorded separately along their two perpendicular axes. The recordal of the movement of each of the upper slides and lower slides appear respectively as lines 82 and 84 on separate recording surfaces 86 and 88. The recording and sensing elements are denoted generally by the numerals 90 and 92 and are arranged with respect to their associated recording supports 86 and 88 so that lines 82 and 84 are drawn parallel to the axis of movement of the respective slide. Sensing of the separate recordings is made in the same manner as earlier described, and its signals are fed to the control unit 32. The mechanism 90 is mounted so as to be secured to the lower slide 66 by the indexing mechanism similar to that described with FIG. 5 while the recording and sensing mechanism indicated by the numeral 92 is similarly mounted to the upper slide 68. Similar indexing mechanism 78 is arranged. As noted in FIG. 6 the indexing mechanism 78 and 76 is arranged so that the arms 42 extend in a direction at right angles to the axis of movement of the respective slides so that the indicia 82 and 84 of the movement of these slides are arranged parallel to their axes, while the offsetting index is accomplished perpendicular thereto, in opposition to the manner shown in FIG. 5.

From the foregoing it will be apparent that the present invention employs the technique of recording a work program directly from the operation of the movable members of the machine tool itself and which is not dependent upon the punch tape or the operation of the numerical control system or of the computer operating the machine tool. In all of the repeated subsequent runs, other than the first and initial run, the checking and monitoring of the accuracy of the movement of the machine tool is obtained from a recorded profile independently of the actual command to the machine. This recorded profile is as indicated preferably visible so that the operator of the machine tool can always have a specific picture to which to refer during the operation. Furthermore, the visible profile enables it to be sensed and scanned either optically or mechanically to insure greater accuracy.

Various embodiments, changes and modifications having been given. The recording may, as desired, be made directly on the support 14 or on recording media, such as a paper, film or the like, which is removable and expendable. The recording in addition to the optical system described can be in the form of conventional "phonograph" type recording in which the path is etched and later sensed by a stylus or needle. Similarly, a magnetic or light recordal system can be utilized. A paper and pencil recording is most economical, and provides the required visual recording.

The present invention further enables the control of the speed of the tool during subsequent runs, via the recorded path, which as noted can feed back into the numerical control unit signals indicative of the accuracy of the machine at speed. It is intended therefore that the present disclosure be taken as illustrative only and not as limiting of the scope of the invention.

A suitable numerical control system for operation of a lathe such as shown in FIGS. 5 and 6, which may be employed in the present system is commercially available and was described by the General Electric Company, Waynesboro, Va. under the name Mark Century 7542. Reference may be made to the General Electric publication detailing the same, dated Feb. 1970, GEK 15159, GEK 14899, GEK 14897 and GEK 14948, and to other sections, if needed.

What is claimed is:

1. The method of checking and monitoring the path of movement of a movable member of a numerically controlled machine tool comprising the steps of providing a system in which a track may be selectively recorded on a surface, by an instrument conjointly movable with each movement of said movable member and a system in which said recorded track may be followed by a scanner conjointly movable with the subsequent movement of said movable member, operating said machine, according to said control program, recording as a series of tracks independent of said controlled program the entire path of movement of the initial run of the said movable member according to the control program, thereafter repeating the operation of said tool in response to the control program in successive runs and causing the scanner to conjointly follow the recorded path of said tracks in each succesive run, and to sense the recorded path of said tracks during each of the subsequent runs, and producing a signal responsive to the departure of said scanner from the recorded path of said tracks.

2. The method according to claim 1, wherein said recording is produced so as to be visible.

3. The method according to claim 1, wherein the path of movement of said movable member is represented in said recording as a single path.

4. The method according to claim 1, including the step of recording the movement of a pair of movable members, moving along axes at right angles to one another in which the paths of each are recorded separately.

5. The method according to claim 1 wherein portions of the recorded path of movement are offset with respect to each other whereby movement of said movable member in the same position at successive times can be separately recorded.

6. The method according to claim 5, wherein the successive portions of the path of movement are offset by predetermined uniform amounts in the same direction.

7. The method according to claim 1, wherein portions of the recorded path of movement are indicated in a different manner with respect to other portions of the path of movement, whereby distinctions may be made between them.

8. The method according to claim 7 wherein portions of the recorded path of movement are provided with indicia indicative of the speed of said movable member.

9. The method according to claim 8, wherein the sensing of the recorded path is responsive to the different indicia so as to control the speed of operation of the movable member.

10. Apparatus for checking and monitoring the path of movement of a movable member of a numerically controlled machine tool in response to a controlled program comprising a recording surface stationarily supported with respect to said movable member and movable member for an instrument for recording thereon, said instrument being mechanically connected to said conjoint movement therewith, said instrument and said recording surface cooperating on movement of said movable member to record on said recording surface a series of tracks independent of said control program corresponding to the initial path of movement of said movable member under the controlled program and scanning means arranged above said recording surface said scanning means being mechanically connected to said movable member to conjointly move therewith to serially follow the path of said tracks during subsequent runs of said movable member and means for continuously sensing the path of said serially recorded tracks producing a signal responsive the the deviation of said scanning means from said tracks indicating the departure of said movable member from its recorded initial path of movement.

11. The apparatus according to claim 10, wherein said recording surface comprises means for receiving visual indicia and said recording instrument comprises means for writing thereon.

12. The apparatus according to claim 10, wherein said scanning means comprises an optical sensing mechanism for determining said indicia.

13. A machine tool having a movable member is carried by means movable in perpendicular axes, each of said means having the recording surface, instrument and scanning means of claim 10 for recording and sensing movement along each of the respective axes.

14. The apparatus according to claim 10, wherein said recording instrument and said scanning means are mounted on a common carrier, rotable about an axis parallel to the plane of said recording surface.

15. The apparatus according to claim 14, wherein said recording instrument and said scanning means are arranged on said common carrier in a common plane perpendicular to said axis of rotation, and means are provided limiting rotation of said carrier to selectively position either of said recording instrument and scanning means perpendicularly above said recording surface.

16. The apparatus according to claim 15, including means for radially adjusting the position of said recording instrument in said carrier with respect to the recording surface.

17. The apparatus according to claim 15, including means for radially adjusting the position of said sensing means in said carrier with respect to said recording surface.

18. The apparatus according to claim 16, wherein the means for adjusting the position of recording instrument comprises means responsive to an electric pulse, whereby said instrument may be automatically removed from said recording surface.

19. The apparatus according to claim 18, including means for periodically supplying a pulse to said lifting means.

20. The apparatus according to claim 10, including means for recording selected portions of the path of movement in tracks having different characteristics with respect to other portions of the path of movement, whereby distinctions may be made between them.

21. The apparatus according to claim 20 wherein said characteristics of said selected portions are indicative of the speed of said movable member.

22. The apparatus according to claim 21 including means responsive to the sensing of said selected portions of varying characteristics for controlling the speed of said movable member.

23. The apparatus according to claim 10 including a numeric control device for providing a predefined program of operation for said movable member, including means responsible to said signal from said scanning means to modify the operation of said movable member.

24. The apparatus according to claim 10 wherein said recording surface is magnetizable material and said recording instrument is a magnet.

25. Apparatus for checking and monitoring the path of movement of a movable member of a numerically controlled machine tool in response to a controlled program comprising a planar recording surface and an instrument for recording thereon, one of which being arranged for conjoint movement with said movable member, the other of which being stationarily supported, said recording surface comprising means for receiving an engraved indicia and said recording instrument comprising means for engraving thereon, said instrument being adapted to record on said recording surface a series of tracks independent of said control program corresponding to the path of movement of said movable member under the controlled program and scanning means including tactile means for sensing said engraving arranged above said recording surface for sensing the recorded tracks, said recording surface and said scanning means being relatively movable to each other conjointly with said movable member to serially follow the path of said tracks during subsequent runs thereof and means for producing a signal responsive to the deviation of said scanning means from said tracks indicating the departure of said movable member from its recorded path of movement.

26. The apparatus according to claim 25, including means for indexing one of said recording surfaces or said recording instrument from its normal path of movement during the movement of said movable machine member whereby overlapping paths in the same direction are separately recorded.

* * * * *